3,270,382
SHELL MOULD PROCESS
Harold Garton Emblem, Grappenhall, and Earl Whiteway Fothergill, Liverpool, England, assignors to Philadelphia Quartz Company, Philadelphia, Pa., a corporation of Pennsylvania
No Drawing. Filed Nov. 5, 1963, Ser. No. 321,401
Claims priority, application Great Britain, Nov. 16, 1962, 43,525/62
10 Claims. (Cl. 22—196)

This invention relates to the manufacture of moulds for the casting of metals and is more particularly concerned with the manufacture of what are known as shell moulds.

According to the invention there is provided a method of making a shell mould which comprises applying to an expendable pattern alternately a coating of a gel-forming acid-hydrolysed alkyl silicate solution and a coating of a gel-forming basic silicate ester material, the hydrolysed silicate solution and/or the basic silicate ester material having refractory material suspended therein, the acid-hydrolysed solution and the basic silicate ester of the applied coatings each acting upon the other so as to cause the gelation of the other. Each coating is preferably dusted with refractory powder before the next is applied. A sufficient number of coatings are applied to give a shell of the desired thickness. By a gel-forming acid-hydrolysed alkyl silicate solution we mean one which can be made to set to a gel by the action of a base. By a gel-forming basic silicate ester material we mean one which can be made to set by the action of water.

The acid-hydrolysed silicate solution may be prepared from a lower alkyl silicate such as methyl, ethyl, isopropyl or n-butyl silicate; the silicate may be an orthosilicate material or a polysilicate material or a mixture of these. The preferred alkyl silicates are the ethyl and isopropyl silicates. Methods of preparing acid-hydrolysed solutions of ethyl and isopropyl silicates are described in The Industrial Chemist, February 1959, pages 55–58, Metallurgia, January 1950, pages 157–159, patent specification 3,070,861 and Patent 3,146,252. The acid-hydrolysed solution preferably has a silica concentration of between 10 and 25% by weight.

The basic silicate ester material may suitably be a gel-forming aminoalkyl silicate ester such as those suitable for use in the process for binding a particulate refractory material described in Patent 3,112,538; specific aminoalkyl silicate esters suitable for use in the method of the invention are those prepared in accordance with Examples 1 to 8 of Patent 3,112,538. The basic silicate ester material may also be the aminoalkyl silicate product prepared as described and claimed in patent specification 3,079,656; specific examples of such products which may be used in the method of the present invention are those prepared in accordance with Examples 1 to 16 and 19 to 22 of patent specification 3,079,656. The basic silicate ester material may also be a gel-forming reaction product of an aminoalkyl silicate and an oxirane compound prepared as described in Patent No. 3,110,601 such as those produced by reaction between an ethyl (ethanolamine) polysilicate and propylene oxide; specific mention may be made of the gel-forming products prepared in accordance with Examples 1 and 5 of Patent No. 3,110,601. The silicate ester material used must of course be sufficiently basic to cause the gelation of the acid-hydrolysed silicate solution employed. An inert diluent such as isopropanol or other suitable lower alkanol may if desired be used with the basic silicate ester material but such diluent should be anhydrous so as not to cause premature gelation of the silicate ester material.

Suitable refractory materials which may be suspended in the hydrolysed silicate solution and/or the basic silicate ester include sillimanite, zircon, zirconia, alumina, silica and molochite. These same materials may also be used for the dusting of the applied coatings.

The expendable pattern may if desired be given a primary coating of, for example, a suspension of a refractory material in an electrolyte-free silica aquasol. Other known primary coating compositions can also be used.

It is preferred that both the hydrolysed silicate solution and the basic silicate ester have refractory power suspended in them and that the first coating applied to the expendable pattern is that of the suspension of refractory material in the acid-hydrolysed silicate.

The shell mould structures prepared in accordance with the invention may be made sufficiently thick to permit casting therein without any external support or with a loose refractory support. However, relatively thin shells may be produced which are subsequently invested in a slurry of refractory material and a bonding liquid in known manner.

A particularly suitable procedure for carrying out the process of the invention is the following. The expendable pattern, which may be of wax or of some other suitable material of low melting point or of a plastics material such as polystyrene, is dipped into a slurry of fine refractory material in the acid-hydrolysed silicate solution, excess slurry is allowed to drain off and the wet coating is then dusted with refractory powder. The pattern is then dipped into a slurry of refractory powder in the basic silicate ester material and excess again allowed to drain off. The second coating is also dusted with refractory powder and the pattern then allowed to stand for a time sufficient to allow for the mutual gelation of the acid-hydrolysed silicate solution and the basic silicate ester material of the two coatings. This sequence is then repeated so as to build up a shell of the desired thickness; usually, repeating the sequence three or four times giving six or eight coatings gives a shell of adequate thickness. Finally a sealing coat is preferably applied by dipping in the acid-hydrolysed silicate slurry; this coating is not dusted. By this procedure a complete shell free of fluxing constituents, such as alkali metals, can be constructed in a much shorter time than has been possible hitherto. Completed shells have been produced by this procedure in about 10 minutes. The completed shell is then allowed to stand for at least 2 hours, preferably for at least 24 hours, to dry before the pattern is removed and the mould fired. In the case of a wax pattern, the dried shell is preferably put into a furnace at, for example, about 1,000° C. so that the pattern removal and the firing can be effected in a single operation. The time for firing will vary from about 2 to 8 hours depending on the size and complexity of the shell.

The following examples illustrate the invention.

*Example 1*

A first slurry was prepared by suspending 12 lbs. of zircon, all passing a 200 mesh B.S. sieve, in 3 lbs. of an acid-hydrolysed isopropyl silicate solution containing about 17% $SiO_2$ by weight. The hydrolysed solution was prepared by adding 100 vols. of isopropyl silicate (37–39% $SiO_2$) to a mixture of 100 vols. of isopropanol (containing 1% water by volume), 20 vols. of water and 5 vols. of N/1 hydrochloric acid solution and stirring vigorously until the mixture became clear. The hydrolysed silicate solution was left for 24 hours after it cleared, before being mixed with the zircon powder.

A second slurry was prepared by suspending 12 lbs. of zircon, all passing a 200 mesh B.S. sieve, in a mixture of 1 lb. of anhydrous isopropanol and 2 lbs. of the aminoalkyl silicate ester material prepared by reaction between isopropyl silicate and 2-amino-2-methyl-propan-1-ol as described in Example 1 of patent specification 3,079,656.

A wax pattern was then dipped into the first slurry, excess allowed to drain off and the wet coating dusted with sillimanite of −30 +80 I.M.M. sieve grading. The pattern was then dipped into the second slurry, excess allowed to drain off, the coating dusted with the sillimanite powder and the pattern allowed to stand for about 1 minute to allow for the gelation of both the hydrolysed isopropyl silicate solution and the basic aminoalkyl silicate ester material. This procedure was then repeated four times after which a final sealing coat was applied by dipping the pattern into the first slurry again.

The completed shell was then left for 24 to 48 hours to dry before de-waxing and firing which was affected by placing the dried shell into a furnace at 1,000° C. for 2 to 8 hours. Metal may be cast into the fired shell while still hot.

*Example 2*

An ethyl silicate hydrolysate was prepared by mixing in the order given

| | Ml. |
|---|---|
| Ethyl silicate (containing about 40% SiO$_2$ by weight) | 250 |
| Isopropyl alcohol (containing 1% water by volume) | 250 |
| N/1 hydrochloric acid solution | 125 |
| Water | 50 |

The hydrolysate was allowed to stand 16 hours before use.

A first slurry was prepared by suspending 600 grams of molochite in 180 grams of the above hydrolysate and 180 grams of water.

A second slurry was prepared by suspending 600 grams of molochite in a mixture of 180 grams of anhydrous isopropyl alcohol, and 180 grams of the aminoalkyl silicate ester material employed in Example 1.

The shell was made as described in Example 1, again using sillimanite of −30 +80 I.M.M. grading as dusting material. Drying, dewaxing and firing were as described in Example 1.

The molochite used was of such a grade that substantially all of it passed a 200 mesh B.S. sieve.

What is claimed is:

1. A method of making a shell mould which comprises applying to an expendable pattern alternately a coating of gel-forming acid-hydroylsed alkyl silicate solution and a coating of a gel-forming basic silicate ester material comprising an amino alkyl silicate, refractory material being suspended in at least one of the liquids used to form the coatings, the acid-hydrolysed solution and the basic silicate ester of the applied coatings each acting upon the other so as to cause the gelation of the other.

2. A method as claimed in claim 1, in which both the acid-hydrolysed silicate solution and the basic silicate ester material have refractory powder suspended in them.

3. A method as claimed in claim 1, in which each coating is dusted with refractory powder before the next coating is applied.

4. A method as claimed in claim 1 comprising the steps of (1) dipping an expendable pattern into a slurry of refractory material in the acid-hydrolysed silicate solution (2) allowing excess slurry to drain off (3) dusting the wet coating with refractory powder (4) dipping the pattern into a slurry of refractory powder in the basic silicate ester material (5) allowing excess slurry to drain off (6) dusting the wet coating with refractory powder (7) allowing the pattern to stand for a time sufficient to allow for the gelation of both the acid-hydrolysed solution and the basic silicate ester material; and repeating steps 1 to 7 until a shell of the desired thickness has been built up.

5. A process according to claim 1 wherein a final coating is applied by dipping the pattern into a slurry of refractory powder in the acid-hydrolysed silicate solution.

6. A method as claimed in claim 1, wherein the acid-hydroylsed silicate solution is an acid-hydrolysed solution of an alkyl silicate in which the alkyl group contains from 1 to 4 carbon atoms.

7. A method as claimed in claim 1 wherein the alkyl silicate is selected from the class consisting of ethyl and isopropyl silicates.

8. A method as claimed in claim 1 wherein the hydrolysed solution has a silica concentration of 10–25% by weight.

9. A method as claimed in claim 1 where a total of up to 10 coatings are applied to the pattern.

10. A method as claimed in claim 1 wherein after the coatings have been applied and gelled, the coated pattern is allowed to dry for up to about 48 hours whereafter the pattern is removed and the shell formed fired at about 1000° C. for up to about 8 hours.

References Cited by the Examiner

UNITED STATES PATENTS

| | | | |
|---|---|---|---|
| 2,806,269 | 9/1957 | Dunlop | 22—196 |
| 2,806,270 | 9/1957 | Shaul | 22—196 |
| 3,024,125 | 3/1962 | Lee | 22—193 |
| 3,112,538 | 12/1963 | Emblem | 22—193 |

J. SPENCER OVERHOLSER, *Primary Examiner.*

MARCUS U. LYONS, *Examiner.*